Patented Sept. 11, 1945

2,384,544

UNITED STATES PATENT OFFICE.

2,384,544

METHOD OF PREPARING SYNTHETIC RUBBER

Charles F. Fryling, Akron, Ohio, assignor, by mesne assignments, to The B. F. Goodrich Company, Akron, Ohio, a corporation of New York No Drawing. Application June 27, 1941, Serial No. 400,093

13 Claims. (Cl. 260—23)

This invention relates to the preparation of synthetic rubber and particularly to rapid preparation of synthetic rubber-like materials from mixtures of butadiene-1,3 hydrocarbons.

It has previously been known that butadiene and isoprene may be copolymerized in the form of an aqueous emulsion. In previous processes, however, the polymerization has required a long time and the products have been weak and inextensible. It is the principal object of this invention to prepare copolymers of butadiene-1,3 hydrocarbons by a polymerization process which ordinarily requires not over three days and produces extensible polymers exhibiting sufficient tensile strength to make them useful as a replacement for natural rubber.

By the method of this invention, at least two butadiene-1,3 hydrocarbons are copolymerized in an aqueous emulsion in the presence of an alpha-methylene nitrile. The invention further contemplates in the preferred modification, the use of a water-soluble soap derived from a fatty acid containing between 10 and 20 carbon atoms per molecule as the emulsifying agent, and conducting the polymerization in the presence of a compound containing a heavy metal as will hereafter be described.

By the term "butadiene-1,3 hydrocarbon" is meant butadiene-1,3, commonly called butadiene and homologues of butadiene-1,3 which enter into polymerization reactions in substantially the same manner such as isoprene, piperylene, and 2,3-dimethyl butadiene. Butadiene may be copolymerized in any desired proportions with isoprene, piperylene, or 2,3-dimethylbutadiene by the method herein described, or three butadiene hydrocarbons such as a mixture of butadiene, isoprene, and piperylene may be present in the same charge.

The polymerization is effected in the presence of a small amount of an alpha-methylene nitrile, by which is meant nitriles containing a methylene group attached to the carbon atom adjacent to the —C≡N group, such as acrylonitrile, alpha-methacrylonitrile, alpha-ethacrylonitrile, alpha-methoxy-methacrylonitrile, alpha-chlormethacrylonitrile, etc. The preferred synthetic rubbers of this invention are prepared in the presence of from about 2 to 10% by weight based on the butadiene hydrocarbons of an alpha-methylene nitrile, particularly acrylonitrile.

It is preferred to conduct the polymerization in the presence of between 5 and 15% by weight based on the butadiene hydrocarbons of an emulsifying agent consisting of a water-soluble soap derived from a fatty acid containing between 10 and 20 carbon atoms per molecule such as lauric acid, myristic acid, palmitic acid, oleic acid, or stearic acid. Any water-soluble soap such as those derived from the fatty acid by reaction with sodium or potassium hydroxide may be employed. It is in general desirable to conduct the polymerization in the presence of free fatty acid; i. e. in the presence of fatty acid which is only 85 or 90% neutralized, although polymerizations may be conducted in the presence of completely neutralized soap or even in the presence of free alkali. The polymerization may also be effected under acid conditions, in which case the salts of organic bases containing long carbon chains such as the hydrochloride of diethylaminoethyloleylamide, trimethylcetylammonium methyl sulfate, the hydrochloride of oleylamidoethyldimethylamine, the hydrochloride of the diethylaminoethoxyanilide of oleic acid, etc., may be employed, or under acid alkaline, or neutral conditions in the presence of emulsifying agents such as hymolal sulfates and aryl sulfonates such as sodium lauryl sulfate, sodium isobutyl naphthalene sulfonate, etc.

The polymerization is preferably conducted in the presence of a small amount of a heavy metal catalyst. The heavy metal catalyst may be added to the emulsion in the form of less than .1% based on the weight of the monomers of simple ionizable heavy metal salt such as cobalt chloride, nickel sulfate, mercuric chloride, etc., as disclosed in the copending application of William D. Stewart, Serial No. 379,712, filed February 14, 1941 or in the form of a redox system comprising a heavy metal and a material such as sodium pyrophosphate, levulinic acid, glycine, cystine, beta-mercaptoethanol, quebrachitol, ox-bile, or cholesterol, as disclosed in the copending applications of William D. Stewart, Serial Nos. 379,713 to 379,717, filed February 14, 1941.

The polymerization may be effected by various initiators of polymerization such as per-compounds including hydrogen peroxide, benzoyl peroxide, ammonium persulfate, potassium persulfate, and other peroxides and persalts such as persulfates, perborates, percarbonates, and the like, as well as other types of initiators such as diazoaminobenzene, dipotassium diazomethane disulfonate, and triphenylmethylazobenzene. Sulfur-containing organic compounds, herein called modifiers, which increase the plasticity and solubility of the polymers such as dialkyl dixanthogens, the higher tetraalkyl thiuram mono-, di-, and polysulfides, 2-mercaptoalkylthiazoles, and bis-alkylthiazyl-2 disulfides are also preferably present in the emulsion during the polymerization.

As a specific example of the method by which the three-component copolymers of this invention may be prepared, 50 parts by weight of butadiene, 50 parts of isoprene, 3 parts of acrylonitrile, and 0.35 part of hydrogen peroxide as an initiator were agitated at 30° C. in about 250 parts of a 2% aqueous solution of myristic acid which had been 85% neutralized with sodium hydroxide. After 65 hours, a latex-like dispersion was obtained which, when stabilized and coagulated, yielded 93 parts of a three-component copolymer of butadiene, isoprene and acrylonitrile. When the experiment was repeated employing a two-component system containing 50 parts of butadiene and 50 parts of isoprene, no copolymer was formed after 65 hours at 30° C. and an additional 24 hours at 35° C.

In another experiment, 50 parts of butadiene, 50 parts of isoprene, 3 parts of acrylonitrile, 0.35 part of hydrogen peroxide, 0.37 part of sodium ferripyrophosphate as an activator, and .6 part of diisopropyl dixanthogen as a modifier were agitated at 30° C. in about 250 parts of a 5% aqueous solution of myristic acid which had been 85% neutralized with sodium hydroxide. A latex-like dispersion was obtained which, upon stabilization with phenyl-beta-naphthylamine and coagulation with a saturated sodium chloride solution, yielded 94 parts of a three-component copolymer of butadiene, isoprene, and acrylonitrile. When tested in a tire tread recipe, the copolymer exhibited a tensile strength of 2600 lbs./in.$^2$ and an elongation of 57%. When 0.5 part of cobalt chloride was used as the activator in the above recipe and 1 part of 2-mercapto-4-ethylthiazole was used as the modifier, a tensile strength of 3100 lbs./in.$^2$ and an elongation of 510% was exhibited by the copolymer when it was tested in a tire tread recipe.

It is not necessary that the butadiene and the isoprene enter into the three-component copolymers in equal proportions, for a larger amount of either may be employed, somewhat better results ordinarily being obtained when the amount of isoprene is not less than the amount of butadiene. 20 parts of butadiene, 80 parts of isoprene, 3 parts of acrylonitrile, 0.35 part of hydrogen peroxide, and 0.37 part of sodium ferripyrophosphate were agitated at 30° C. in about 250 cc. of a 5% aqueous solution of myristic acid which had been 85% neutralized with sodium hydroxide. In 46 hours, 100 parts of synthetic rubber were formed which exhibited a tensile strength of 2600 lbs./in.$^2$ and an elongation of 420% when tested in a tire tread recipe.

Although I have herein disclosed specific embodiments of my invention, the invention is not to be limited solely thereto, for many modifications which will be apparent to those skilled in the art are within the spirit and scope of the invention as defined in the appended claims.

I claim:

1. The method which comprises polymerizing in the form of an aqueous emulsion a mixture containing at least two butadiene-1,3 hydrocarbons and from about 2 to 10% by weight based on the butadiene hydrocarbons of an alpha-methylene nitrile.

2. The method which comprises polymerizing in the form of an aqueous emulsion a mixture of butadiene, isoprene, and from about 2 to 10% by weight based on the butadiene and isoprene of acrylonitrile.

3. The method which comprises polymerizing in the form of an aqueous emulsion a mixture of approximately equal proportions of butadiene and isoprene, and from about 2 to 10% by weight based on the butadiene and isoprene of acrylonitrile.

4. The method which comprises polymerizing in the form of an aqueous emulsion a mixture of butadiene, isoprene, and from about 2 to 10% by weight based on the butadiene and isoprene of acrylonitrile, said polymerization being effected in the presence of from 5 to 15% by weight based on the butadiene and isoprene of a water-soluble soap derived from a fatty acid containing between 10 and 20 carbon atoms per molecule.

5. The method which comprises polymerizing in the form of an aqueous emulsion a mixture of butadiene, isoprene, and from about 2 to 10% by weight based on the butadiene and isoprene of acrylonitrile, said polymerization being effected in the presence of from 5 to 15% by weight based on the butadiene and isoprene of a water-soluble soap derived from a fatty acid containing between 10 and 20 carbon atoms per molecule and a small amount of a heavy metal catalyst.

6. The method which comprises polymerizing in the form of an aqueous emulsion a mixture of butadiene, isoprene, and from about 2 to 10% by weight based on the butadiene and isoprene of acrylonitrile, said polymerization being effected in the presence of from 5 to 15% by weight based on the butadiene and isoprene of a water-soluble soap derived from a fatty acid containing between 10 and 20 carbon atoms per molecule and a small amount of a heavy metal catalyst.

7. The method which comprises polymerizing in the form of an aqueous emulsion a mixture of approximately equal proportions of butadiene and isoprene, and about 3% based on the butadiene and isoprene of acrylonitrile, said polymerization being effected in the presence of from 5 to 15% based on the butadiene and isoprene of sodium myristate and a sodium ferri pyrophosphate catalyst.

8. A composition prepared by the method of claim 1.

9. A composition prepared by the method of claim 2.

10. A composition prepared by the method of claim 4.

11. A composition prepared by the method of claim 5.

12. A composition prepared by the method of claim 6.

13. A composition prepared by the method of claim 7.

CHARLES F. FRYLING.

CERTIFICATE OF CORRECTION.

Patent No. 2,384,544.　　　　　　　　　　　　　　　　September 11, 1945.

CHARLES F. FRYLING.

It is hereby certified that error appears in the printed specification of the above numbered patent requiring correction as follows: Page 2, first column, line 36, for "57%" read --570%--; and that the said Letters Patent should be read with this correction therein that the same may conform to the record of the case in the Patent Office.

Signed and sealed this 19th day of February, A. D. 1946.

Leslie Frazer (Seal)　　　　　　　　　　First Assistant Commissioner of Patents.